United States Patent [19]

Kanda et al.

[11] Patent Number: 4,511,998
[45] Date of Patent: Apr. 16, 1985

[54] MULTIELEMENT ACOUSTIC TRANSDUCER AS WELL AS A METHOD OF MANUFACTURING THE SAME AND AN ACOUSTIC IMAGING INSTRUMENT

[75] Inventors: Hiroshi Kanda, Tokorozawa; Isao Ishikawa, Hino; Toshio Kondo, Kunitachi, all of Japan

[73] Assignee: Hitachi, Ltd., Tokyo, Japan

[21] Appl. No.: 530,469

[22] Filed: Sep. 8, 1983

Related U.S. Application Data

[63] Continuation of Ser. No. 226,819, Jan. 21, 1981, abandoned.

[30] Foreign Application Priority Data

Jan. 21, 1980 [JP] Japan ................................ 55-4624

[51] Int. Cl.³ .......................................... G01N 29/00
[52] U.S. Cl. ......................................... 367/11; 73/642; 73/618; 310/334; 310/800; 367/104
[58] Field of Search ............... 310/320, 334, 335, 336, 310/800; 73/642, 618; 128/660; 367/150, 162, 164, 176, 7, 8, 11, 104, 120

*Primary Examiner*—Richard A. Farley
*Attorney, Agent, or Firm*—Antonelli, Terry & Wands

[57] ABSTRACT

A multielement acoustic transducer comprising a metal plating which is formed by plating the convex surface of a low-melting metal having a plurality of convex semispherical holes and then fusing and removing the low-melting metal, the metal plating being used as a base electrode, a piezoelectric material which is formed on the base electrode, and a top electrode which is formed on the piezoelectric material, the piezoelectric material functioning as concave transducer elements.

12 Claims, 12 Drawing Figures

MULTIELEMENT ACOUSTIC TRANSDUCER AS WELL AS A METHOD OF MANUFACTURING THE SAME AND AN ACOUSTIC IMAGING INSTRUMENT

This is a continuation of application Ser. No. 226,819 filed Jan. 21, 1981, now abandoned.

BACKGROUND OF THE INVENTION

1. Field of the Invention

This invention relates to a multielement acoustic transducer and a method of manufacturing the same. It relates also to an acoustic imaging instrument, particularly an instrument utilizing ultrasonic energy of high frequency.

2. Description of the Prior Art

Heretofore, a scanning acoustic microscope (abbreviated to "SAM") has been proposed by utilizing an ultrahigh-frequency acoustic wave whose acoustic frequency is 1 GHz and whose wavelength in the water is accordingly as short as approximately 1 micron.

More specifically, as shown in FIG. 1, between a transducer 10 for generating a focussed acoustic beam 14 and a detecting transducer 12, a specimen 16 and a speciman supporter 18 which are situated in the focal zone of the acoustic beam are mechanically scanned in the directions of the X- and Y-axes as indicated in the figure. Then, the focussed beam spot scans the speciman surface in the two dimensions. Therefore, when acoustic waves transmitted through and reflected from the specimen are detected by the use of X and Y signals synchronous with the scanning and are displayed on a cathode-ray tube 30 as the so-called Z signal, the two-dimensional acoustic image of the specimen is obtained.

In order to realize the mechanical scanning, it is the practice to employ a moving coil 20 and a coil driver 24 for the fast scanned axis (X-directional scan) and a stepping motor or hydraulic piston 22 for the slow scanned axis (Y-directional scan). Technical problems in such mechanical scanning system are the scanning speed and the scanning area. The former concerns the imaging time of the two-dimensional image (in other words, the period of time required for finishing the image), while the latter concerns the field of view.

On account of the mechanical scanning, there are the contradictory circumstances that when it is intended to take a wide view, the imaging time becomes long and that when it is intended to shorten the imaging time, only a narrow view can be taken. It has heretofore been impossible to realize an imaging instrument of high-speed imaging and wide view. The reasons therefor are that, in general, a mechanical system has the scanning area narrowed more as the scanning speed is higher, and that in order to acquire a detection signal of satisfactory signal-to-noise ratio, a beam spot needs to effectively stay on a scanned point for at least a fixed time.

SUMMARY OF THE INVENTION

This invention has been made in view of the drawbacks described above, and has for its object to provide an acoustic transducer capable of imaging a wide view at high speed and suitable for an acoustic microscope, as well as a method of manufacturing the same.

Another object of this invention is to provide an acoustic microscope which can form a two-dimensional acoustic image of identical view field at an identical signal-to-noise ratio in a remarkably short time. Still another object of this invention is to provide an acoustic microscope which can form a two-dimensional acoustic image of identical imaging time at an identical signal-to-noise ratio over a remarkably wide view.

This invention is characterized in that a multielement transducer is employed for accomplishing these objects.

Hereunder, this invention will be described with reference to the drawings.

DESCRIPTION OF THE PREFERRED EMBODIMENTS

Figure 1:
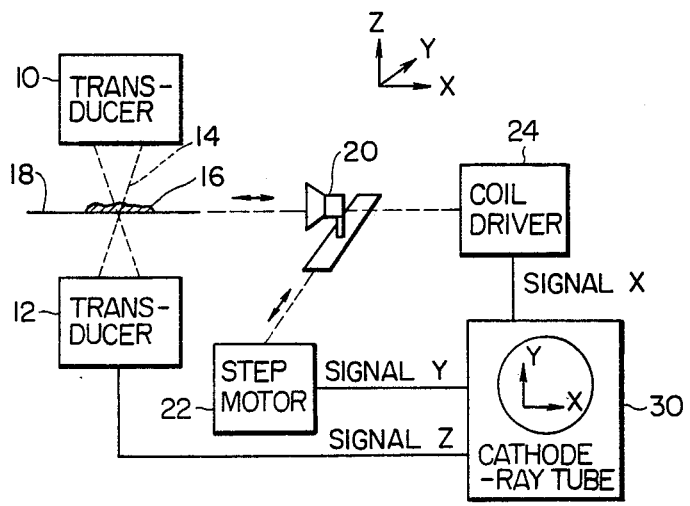
FIG. 1 is a diagram showing a prior-art construction of an acoustic microscope resorting to mechanical scanning.
Figure 2:
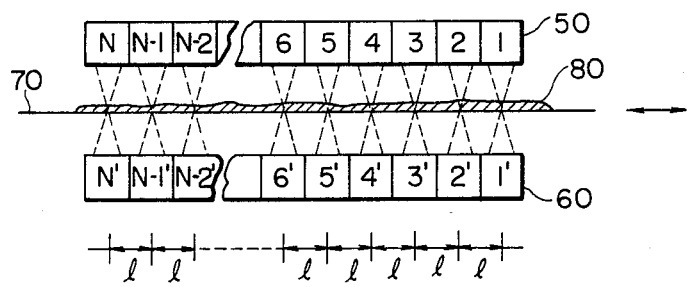
FIG. 2 is a diagram for explaining the construction of the essential portions of this invention.

FIG. 2 is a diagram for explaining the construction of the essential portions of this invention, and typically illustrates transducer elements arrayed unidimensionally. An array transducer for generating focussed beams, 50 is adapted to generate the N focussed beams at intervals l. An array transducer for detecting acoustic waves, 60 similarly includes N detecting elements at intervals l, which oppose to the generating elements in a manner to be confocal therewith. A specimen 80 carried on a specimen supporter 70 within a focal zone between these transducers is mechanically scanned as indicated by arrows in the figure.

In such construction, when the elements of the focussed beams-generating array transducer 50 are simultaneously excited with an RF electrical signal, the N focussed beams are projected onto the specimen 80. The N acoustic beams transmitted through the specimen 80 and modulated depending on the elastic properties of the specimen 80 are independently received by the N detecting elements of the detecting transducer 60, whereby N independent detected signals can be obtained. That is, the information of N scanning points on the specimen surface are detected at once. Accordingly, when the specimen 80 is mechanically moved the length of l, the specimen area of $N \times l$ in case of this construction is entirely scanned. Thus, it is permitted to scan the view field of $N \times l$ within a time required for mechanically scanning a view field of l in the prior-art instrument, and the object of making it possible to form an acoustic image of identical imaging time at an identical signal-to-noise ratio over a view field which is N times wider than in the prior-art instrument can be accomplished. This fact signifies that when the prior-art instrument images the field of view of $N \times l$, this invention may mechanically scan only l in order to provide the same field of view, and it accomplishes the object of this invention that a two-dimensional acoustic image of identical view field is provided at an identical signal-tonoise ratio in an imaging time which is 1/N of that in the prior-art instrument.

The fact that the present invention achieves the peculiar objects or effects unattainable with the prior art as above described is based on the arrayal of acoustic sources for generating focussed beams in this invention. That is, in view of the fact that with the mere arrayal of acoustic transducers, signals cannot be independently detected on account of the interactions among the transducers, this invention arrays the acoustic sources for generating focussed beams and thereby accomplishes the objects or effects.

Although, in the above, only the case of the unidimensional array has been referred to for the sake of brevity, it goes without saying that a two-dimensional array may well be employed. The foregoing effects in this case become remarkably great in proportion to $N^2$.

The N or $N^2$ detected signals thus obtained may be simultaneously displayed through, for example, storage in an image memory as will be stated later. Although, in the above explanation, only the case of the transmitted signals has been referred to, it goes without saying that the array transducer for generating focussed beams may well be used also for detecting signals so as to detect the acoustic reflection properties of the specimen.

Now, there will be described a method of manufacturing the array transducer characterizing this invention. In this invention, the respective array elements need to have substantially the same characteristics of focussed beams and sensitivities. In other words, unless such array elements satisfy the same characteristics, a good image of high signal-to-noise ratio cannot be formed by the mere arrayal of a large number of transducer elements.

As set forth above, the arrayal of the acoustic sources for generating focussed beams makes it possible for the first time to independently operate the $N^2$ acoustic transducer elements.

The inventors have developed a technique for producing the array transducer fulfilling such requisite, and have completed this invention. Hereunder, in describing the method of manufacturing the array transducer, the construction of a prior-art transducer will be explained.

Figure 3:
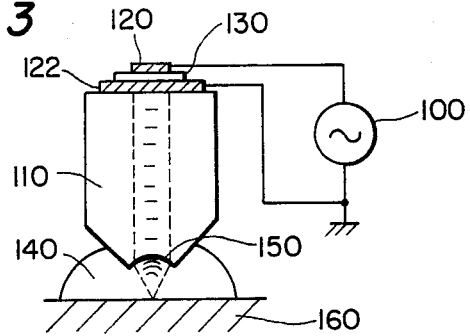
FIG. 3 is a diagram for explaining the construction of a prior-art transducer.

FIG. 3 is a diagram showing the construction of the prior-art transducer. Referring to the figure, one face of a cylindrical crystal 110 made of sapphire, fused silica or the like is optically polished and has a base electrode 122 deposited thereon. A piezoelectric thin film (of ZnO or CdS) 130 is formed on the base electrode 122. Further, a top electrode 120 is deposited on the piezoelectric thin film 130. Thus, a sandwich structure in which the piezoelectric thin film is held between the electrodes is constructed. As shown in the figure, the other face of the crystal 110 is formed with a concave semispherical hole 150 whose radius a curvature is 0.1-0.5 mm. The interspace between the semispherical hole 150 and a specimen 160 is filled with a fluid such as water 140. In such construction, when an RF electrical signal is applied across the pair of electrodes 120 and 122 by means of a power supply 100, a plane acoustic wave is radiated from the piezoelectric thin film 130 into the crystal 110. Upon reaching the semispherical hole 150, the plane acoustic wave is refracted and focussd on account of the difference between the acoustic velocities of the crystal 110 and the fluid 140, with the result that a focussed acoustic beam is projected onto the surface of the specimen 160.

That is, a positive lens owing to the acoustic velocity difference between the crystal formed with the semispherical hole and the fluid is used for forming the focussed acoustic beam. Conversely, an acoustic wave reflected from the specimen 160 undergoes phasing into a plane acoustic wave by means of the lens and then propagates through the crystal 110. This plane acoustic wave is converted into an RF electrical signal by the piezoelectric thin film 130.

As understood from the prior-art example stated above, the focussing characteristic of the acoustic wave is dominated by the shape of the semispherical surface. Accordingly, in order to form the array transducer as in this invention, a large number of semispherical surfaces having an identical shape need to be prepared. Heretofore, the semispherical holes have been prepared one by one by performing the polishing by hand, and it has been impossible to make the large number of semispherical holes in the quite identical shape as in this invention.

There will be described the method of manufacturing the multielement transducer in this invention as opposed to such prior-art transducer.

Figure 4:
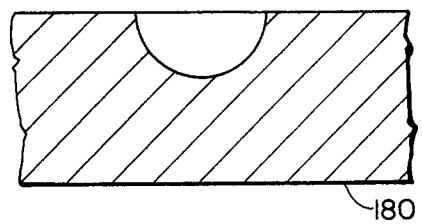
FIG. 4 is a diagram for explaining a method of manufacturing the semispherical hole of a transducer as is the essential portion of this invention.

A semispherical hole having a predetermined size (0.5-0.05 mm in diameter) is formed in one place of a glass plate 180 as shown in FIG. 4. The semispherical hole may well be prepared by the manual polishing. Since, however, the manual operation involves a problem in the working precision and a problem in the circularity of the sphere as well as the flatness of the finished spherical surface, it is difficult to obtain a good semispherical hole. The inventors have prepared the plate having the semispherical surface as shown at 180 in FIG. 4 as follows. In the production of a fused silica glass plate, perfectly spherical bubbles formed by adsorbed gases contained in a starting material are sometimes found in the silica glass. Among the bubbles, one having a proper shape and size is selected. The silica glass plate including the bubble is polished from its one surface and ground down to the vicinity of the equatorial plane of the bubble.

The method of manufacturing the multielement transducer according to this invention is characterized in that a replica is used for obtaining a large number of transducer elements from the single semispherical surface.

Figure 5A:
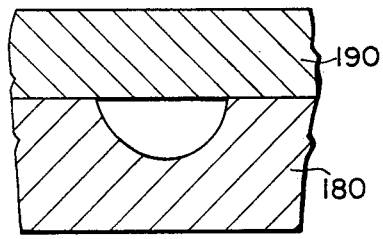
FIGS. 5(a)–5(c) and FIGS. 6(a)–6(b) are diagrams for explaining a method of manufacturing a multielement transducer which is the subject matter of this invention.
Figure 5B:
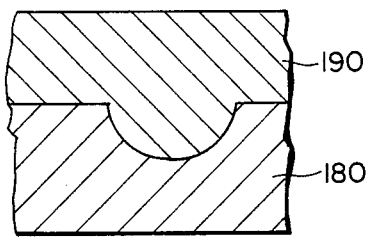
Figure 5C:
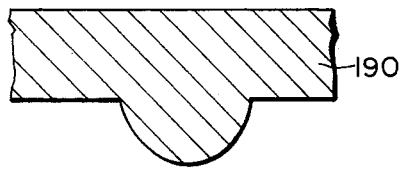

When a low-melting metal 190 (for example, Wood's metal: Bi 50%, Cd 12.5%, Pb 25%, Sn 12.5%, melting point of 68° C.) is stacked on the plate 180 as shown in FIG. 5(a) and then heated, it fuses into the semispherical hole of the plate 180 as shown in FIG. 5(b). Under this state, the stack is restored to the room temperature, whereupon the plate 180 and the low-melting metal 190 is separated from each other. Then, as shown in FIG. 5(c), a convex hemisphere inverse to the semispherical hole of the plate is transferred to the low-melting metal 190. By repeating such jobs, the low-melting metal members which have the convex hemispheres in the same inverse shape to the concave semispherical hole being the master can be prepared in large quantities.

Figure 6A:
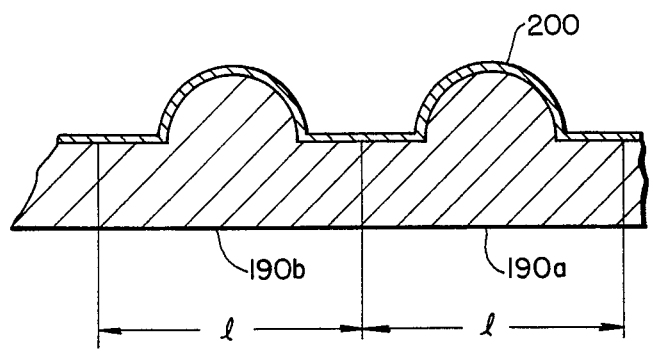
Figure 6B:
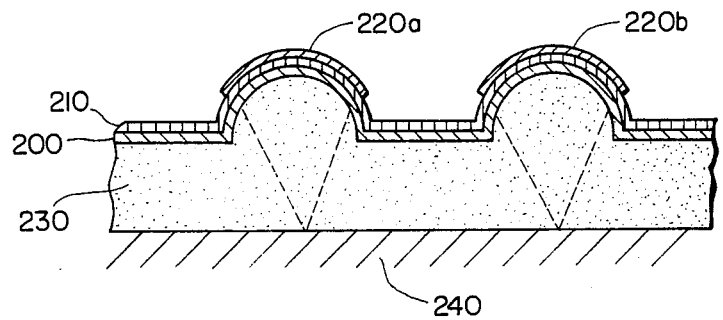

The low-melting metal having such convex semispherical holes is cut out into squares, one side of each of which is l in length and the center of each of which corresponds to the center of the mating semispherical hole, and the square members are arrayed in two dimensions (for example, l being 1 mm). FIG. 6(a) shows a diagram of an embodiment in the case where the transducer includes two elements arrayed unidimensionally for the brevity of the explanation. The surface having the convex spheres is subjected to a metal plating 200 to a thickness of approximately 20 μm as shown in FIG. 6(a). Subsequently, the low-melting metal at 190a and 190b is heated up to its melting point, fused and removed. Then, the metal plating film 200 in a shape as shown in FIG. 6(b) can be formed. A piezoelectric material 210 (for example, ZnO) is deposited on the surface of the metal plating film 200 to a thickness of approximately 2 μm, and top electrodes 220a and 220b are further deposited thereon, whereby the two transducer elements are finished. In this case, when the transducer is opposed to a specimen 240 through a fluid 230, it is apparent that since the plated film is concave, the transducer forms focussed beams as the co-called concave transducer, and that since the transducer elements are the replicas from the identical master, the focussed beam characteristics thereof becomes identical.

The inventors fabricated a 1 GHz-multielement transducer in which lenses each having a radius of 0.1 mm were two-dimensionally arranged into 4×4 arrays at intervals of 300 μm.

In the prior art, it took about 10 seconds to image a view field of 300 μm×300 μm. In contrast, according to this invention, a two-dimensional acoustic image having a view field of 1.2 mm×1.2 mm could be obtained by a mechanical scanning over 300 μm in the same time of 10 seconds. In comparison with the fact that the prior-art method requires 160 seconds for imaging the same view field as obtained by this invention, it is readily understood that the invention achieves a remarkable effect.

Figure 7A:
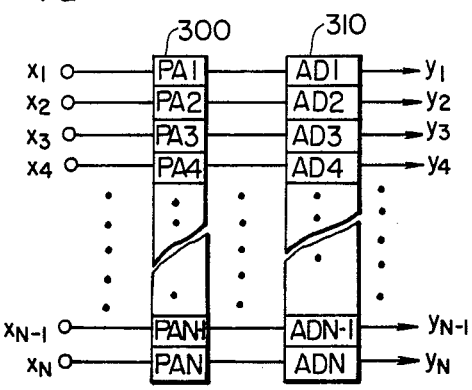
FIGS. 7(a)–7(c) are diagrams showing an example of an instrument which displays an ultrasonic image by the use of the multielement transducer.
Figure 7B:
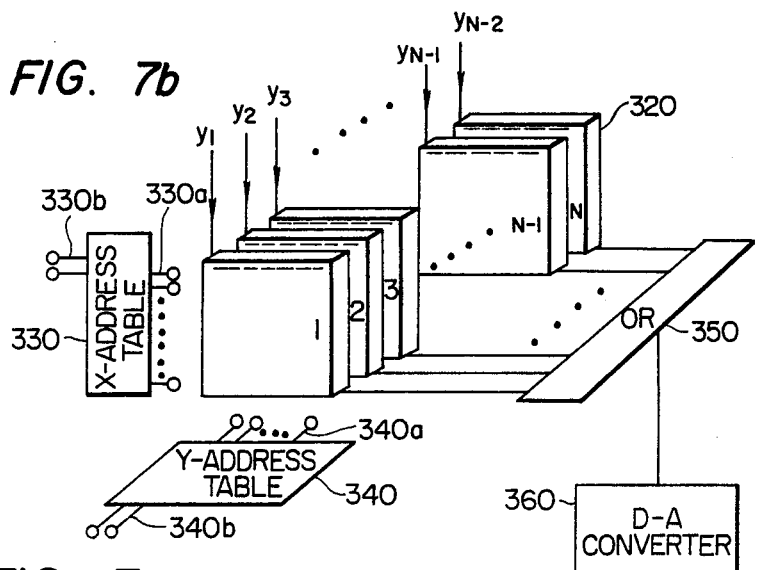
Figure 7C:
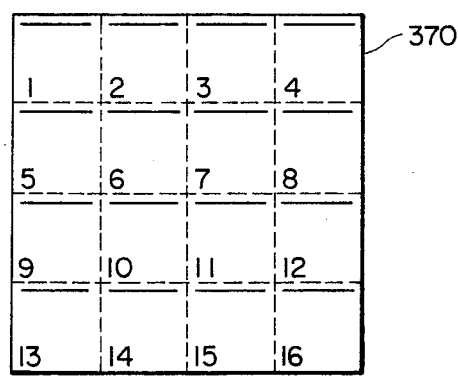

FIG. 7(a)-7(c) are diagrams for explaining a method of displaying an ultrasonic image by the use of the multielement transducer according to this invention. As shown in FIG. 7(a), N detected RF electrical signals $x_1$, $x_2$... and $x_N$ received through the multielement transducer as shown in FIG. 6(b) are individually processed by N preamplifiers (not shown) and detectors 300 and then digitized by analog-to-digital converters 310 into digital signals $y_1$, $y_2$... and $y_N$. As shown in FIG. 7(b), the converted digital signals $y_1$, $y_2$... and $y_N$ are written into an image memory block 320. The image memory block 320 consists of that number of modules which is equal to the number of the elements of the multielement transducer. Each module has, for example, 64×64 X and Y addresses and a weight of 4 bits. The detected digital signals are simultaneously written into the respectively corresponding memory modules, the addresses of which are determined by an X address table 330 and a Y address table 340. In case of the writing, address signals for the respective modules may be common. Now, in reading out and displaying the data, the first line of the first module is selected by the tables 330 and 340 and read out, it is supplied to a digital-to-analog converter 360 through a digital OR circuit 350, and it is converted into a brightness signal on a display 370 (shown in FIG. 7(c)) by the converter 360. Subsequently, the first line of the second module is read out and is similarly processed, and the first line of the third module is similarly processed. After the first line of the N-th module has been read out in such manner, the second line of the first module is read out and is processed similarly to the first line thereof. When such operations have been repeated till the read-out of the last line of the N-th module, one picture frame is completed. It is to be understood that when the first line of the N-th module has been read out, the picture screen of the display 370 is as shown in FIG. 7(c) wherein, assuming by way of example N=16, one line is indicated in each of 16 divided areas of the picture screen. In the figure, 330a and 340a in the tables denote the signals for selecting the addresses in the modules, and 330b and 340b denote the signals for selecting the modules.

As set forth above, according to this invention, an acoustic microscope capable of completely imaging a wide view at high speed can be realized. However, this invention is not restricted thereto, but is also applicable to an ultrasonic imaging instrument in which a multielement transducer is constructed by arraying N transducer elements of different characteristics.

Regarding the multielement transducer exhibitive of the different characteristics, in the first place, when an array transducer consisting of N elements of different focal distances is used, a two-dimensional image of N slices down to a certain depth measured from the surface of a specimen can be formed, in other words, an instrument capable of imaging a three-dimensional at once can be realized.

In the second place, respective transducer elements have equal focal distances but have piezoelectric thin films of unequal fundamental resonance frequencies, or respective transducer elements are driven by voltages of unequal RF frequencies, whereby an instrument capable of depicting N acoustic images at different frequencies can be realized. Especially, the latter is effective for specimens whose acoustic properties have frequencydependencies.

We claim:

1. In an acoustic imaging instrument wherein a predetermined object to be imaged is mechanically scanned in two dimensions in a focal zone of a focussed acoustic beam, and an acoustic image of the object to be imaged is formed on the basis of the resultant acoustic beam;

an acoustic imaging instrument characterized in that means to form the acoustic beam includes multielement transducer means for simultaneously transmitting and receiving each beam, the multielement transducer means including a plurality of acoustic transducer elements formed at intervals each being equal to a width of the mechanical scanning, and that each of the plurality of transducer elements has a concave construction.

2. An acoustic imaging instrument as defined in claim 1, characterized in that the plurality of transducer elements provide focussed acoustic beams of unequal focal distances.

3. An acoustic imaging instrument as defined in claim 1, characterized in that the transducer elements have piezoelectric thin films of unequal fundamental resonance frequencies.

4. An acoustic imaging instrument as defined in claim 1, characterized in that the respective transducer elements are driven by drive voltages of unequal RF frequencies.

5. An acoustic imaging instrument as defined in claim 1, wherein the multielement transducer means includes a transmitting multielement transducer array and a receiving multielement transducer array for simultaneously transmitting and receiving each beam.

6. An acoustic imaging instrument as defined in claim 5, wherein the transmitting multielement transducer array and the receiving multielement transducer array are arranged on opposite sides of the object to be imaged for simultaneously transmitting and receiving each beam.

7. An acoustic imaging instrument as defined in claim 1, wherein the plurality of acoustic transducer elements comprise a first metal thin film having a plurality of concave portions, a piezoelectric member formed on the first metal thin film, and a second metal thin film formed on the piezoelectric member, the first and second metal thin films being used as electrodes.

8. An acoustic imaging instrument as defined in claim 7, wherein the piezoelectric member and the second metal thin film have concave portions corresponding to the concave portions of the first metal thin film.

9. An acoustic imaging instrument as defined in claim 1, wherein the multielement acoustic transducer means is formed by the steps of grinding a bubble existent in a predetermined material to the vicinity of an equitorial plane of the bubble, fusing a low-melting metal into a concave surface formed by the bubble, separating the metal from the concave surface to obtain a member having a convex hemisphere of the metal, arranging a plurality of the metal members having the convex hemisphere, forming a metal thin film on the plurality of convex hemispheres, forming a predetermined piezoelectric material on the metal thin film, and forming a metal layer on the piezoelectric material.

10. A multielement acoustic transducer for an acoustic imaging instrument characterized in that a plurality of acoustic transducer means for generating focussed beams comprise a first metal thin film having a plurality of concave portions, a piezoelectric member formed on the metal thin film for generating a focussed acoustic beam from the piezoelectric member, and a second metal thin film formed on the piezoelectric member, the first and second metal thin films being used as electrodes, the multielement acoustic transducer being formed by the steps of grinding a bubble existent in a predetermined material to the vicinity of equitorial plane of the bubble, fusing a low-melting metal into a concave surface formed by the bubble, separating the metal from the concave surface to obtain a member having a convex hemisphere of the metal, arranging a plurality of the metal members having a convex hemisphere, forming a metal thin film on the plurality of convex hemispheres as the first metal thin film, forming a predetermined piezoelectric material on the first metal thin film as the piezoelectric member, and forming a metal layer on the piezoelectric material as the second metal thin film, and wherein a predetermined object to be imaged is mechanically scanned in two dimensions in a focal zone of a focussed acoustic beam, and an acoustic image of the object to be imaged is formed on the basis of a resultant acoustic beam, the plurality of acoustic transducer means being arranged for simultaneously transmitting and receiving each acoustic beam, the plurality of acoustic transducer means being formed at intervals equal to a width of the mechanical scanning.

11. A multielement acoustic transducer as defined in claim 10, wherein the plurality of acoustic transducer means includes a transmitting multielement transducer array and a receiving multielement transducer array for simultaneously transmitting and receiving each beam.

12. A multielement acoustic transducer as defined in claim 11, wherein the transmitting multielement transducer array and the receiving multielement transducer array are arranged on opposite sides of the object to be imaged.

* * * * *